(12) United States Patent
Warren et al.

(10) Patent No.: US 9,309,005 B2
(45) Date of Patent: Apr. 12, 2016

(54) FASTENER ASSEMBLY

(75) Inventors: Martin Geoffrey Warren, Bristol (GB); Phillip Vincent Teague, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 84 days.

(21) Appl. No.: 13/982,170

(22) PCT Filed: Jan. 25, 2012

(86) PCT No.: PCT/GB2012/050152
§ 371 (c)(1),
(2), (4) Date: Sep. 9, 2013

(87) PCT Pub. No.: WO2012/101436
PCT Pub. Date: Aug. 2, 2012

(65) Prior Publication Data
US 2013/0341460 A1    Dec. 26, 2013

(30) Foreign Application Priority Data
Jan. 26, 2011 (GB) .................................. 1101311.7

(51) Int. Cl.
H05F 3/00 (2006.01)
B64D 45/02 (2006.01)
F16B 5/02 (2006.01)
F16B 41/00 (2006.01)

(52) U.S. Cl.
CPC . B64D 45/02 (2013.01); F16B 5/02 (2013.01); F16B 41/002 (2013.01)

(58) Field of Classification Search
CPC .................................. B64D 45/02; F16B 5/02
USPC ........................................................... 361/218
See application file for complete search history.

(56) References Cited

U.S. PATENT DOCUMENTS

| 4,891,732 A | * | 1/1990 | Jones ............................ 361/218 |
| 4,905,931 A | | 3/1990 | Covey |
| 5,175,665 A | | 12/1992 | Pegg |
| 5,330,124 A | | 7/1994 | Le Touche |
| 5,709,356 A | * | 1/1998 | Avenet et al. ................. 244/1 A |

FOREIGN PATENT DOCUMENTS

| CN | 201232111 Y | 5/2009 |
| EP | 0334011 A | 9/1989 |

(Continued)

OTHER PUBLICATIONS

Search Report for Application No. GB1101311.7, dated May 25, 2011.
International Search Report and Written Opinion corresponding to PCT/GB2012/050152, dated Jun. 22, 2012.

*Primary Examiner* — Thienvu Tran
*Assistant Examiner* — Tien Mai
(74) *Attorney, Agent, or Firm* — Hauptman Ham, LLP

(57) ABSTRACT

A fastener assembly for attaching a component or bracket to the inner surface of the skin of an aircraft wing is disclosed. The fastener assembly comprises a bolt having a shaft and a bolt retaining member that threadingly cooperates with the shaft to retain the bolt in a position in which it extends through a hole in the skin. The fastener also includes a component or bracket retaining member that also threadingly cooperates with a portion of the shaft protruding through said bolt retaining member to attach a component or bracket to said inner surface.

10 Claims, 5 Drawing Sheets

(56) References Cited

FOREIGN PATENT DOCUMENTS

| | | | |
|---|---|---|---|
| EP | 0425292 | A1 | 5/1991 |
| EP | 0559535 | A1 | 9/1993 |
| FR | 2629287 | A | 9/1989 |
| GB | 2212580 | A | 7/1989 |
| GB | 2364109 | A | 1/2002 |
| JP | 2002120907 | A | 4/2002 |
| JP | 2002262418 | A | 9/2002 |

* cited by examiner

FASTENER ASSEMBLY

RELATED APPLICATIONS

The present application is a National Phase of International Application Number PCT/GB2012/050152, filed Jan. 25, 2012, and which is based upon and claims the benefit of priority from British Patent Application No. 1101311.7, filed on Jan. 26, 2011.

INTRODUCTION

The present invention relates to a fastener assembly. In particular, it relates to a fastener assembly for attaching a component or bracket to the inner surface of the skin of an aircraft wing. The invention also includes an aircraft skin incorporating a fastener assembly according to the invention and to a method of containing plasma generated by out-gassing due to electromagnetic energy tracking along a clearance gap present between a fastener and a skin of an aircraft wing through which the fastener extends.

BACKGROUND

It is common for hydraulic pipes and other systems to be routed through the inside of an aircraft wing and to be attached to its inner surface. Similarly, components such as heat exchangers often need to be mounted to the inside surface of the wing. As the wing is effectively a fuel tank, the pipes, systems or other components may be immersed in fuel or, at the very least, exposed to fuel vapour.

It is conventional for pipes, systems and components to be mounted on brackets that are mounted on the inside of the skin of an aircraft, in particular on the inner surface of the skin covering the wing using nuts and bolts that pass through holes in the skin and the component or bracket. Ideally, these bolts are a clearance fit through the holes in the skin and the holes in the component or bracket to ensure that the components or pipes can be easily released by undoing the bolts during maintenance or replacement.

When lightening strikes an aircraft wing, the metal outer skin acts as a Faraday cage and so protects the components mounted within the wing from damage and, more importantly, dissipates the energy from the lightening strike away from the fuel. However, it has recently become more common to manufacture the skin of an aircraft wing out of a carbon composite material rather than metal. This reduces its ability to dissipate the energy generated as a result of a lightening strike and has resulted in a problem known as 'out-gassing' in which lightening can track down the clearance gap between a fastener and the skin in which it is received and create hot plasma in a region surrounding the nut. This is a source of ignition that needs to be avoided. Metallic pipes & components are distanced from the inner surface of the skin to reduce the likelihood of lightning energy jumping the gap between the pipe or component & the skin, causing a spark.

It is known to provide a cap or cover that fits over the nut and contain any plasma generated in the region surrounding the nut. However, this additional component may inadvertently come off the nut. Not only would this result in there being no protection against out gassing, but a loose cap in the fuel tank could block fuel flow pipes and filters. Because of its inaccessiblity within the fuel tank, it is also difficult to detect whether any caps have come loose.

One way of alleviating this problem is to make the bolts an interference fit within the aircraft wing so there is no longer any gap for lightening to track down. However, it then becomes difficult to remove the bolts at a later date in order to release the components being held by them.

SUMMARY OF THE INVENTION

The present invention seeks to provide a fastener assembly that overcomes or at least substantially alleviates the aforementioned problems. According to one embodiment, the invention provides a fastener assembly which may be interference fitted within the aircraft wing, but which still allows the components or pipes held by them to be released, without having to remove the pressed-in bolt from the wing.

Although the aforementioned embodiment solves the problem and prevents the out-gassing phenomenon, it would also be desirable to avoid having to use interference fit fasteners as they are harder and more time consuming to fit in the first place, as they must be carefully pressed into place through the skin of the wing and the holes in the wing must be lined with an interference bolt sleeve.

Therefore, in other embodiments, the present invention seeks to provide a fastener assembly having a bolt which may have a clearance fit within the skin of an aircraft wing, but in which any plasma generated as a result of out-gassing is contained without resorting to the use of caps that may come loose within the aircraft wing and/or the fuel tank.

Accordingly, there is provided a fastener assembly for attaching a component or bracket to the inner surface of the skin of an aircraft wing, comprising a bolt having a shaft and a bolt retaining member that threadingly cooperates with the shaft to retain the bolt in a position in which it extends through a hole in the skin, and a component or bracket retaining member that also threadingly cooperates with a portion of the shaft protruding through said bolt retaining member to attach a component or bracket to said inner surface, the assembly further including a collar having a recess that locates over the bolt retaining member received on the shaft to form an enclosed space around the bolt retaining member, the collar being configured to contain plasma generated by out-gassing due to electromagnetic energy tracking along a clearance gap present between said bolt and a skin of an aircraft wing through which the fastener extends, the collar having an aperture therein for the shaft to extend therethrough and an upper mounting face to mount a component or bracket against the collar with the component or bracket retaining member threadingly received on a portion of the shaft protruding through the collar and the component or bracket.

In one embodiment, the bolt retaining member may include a mounting surface at one end to mount a component or bracket thereon so that a component or bracket can be clamped against said mounting surface by the component or bracket retaining member.

Preferably, said one end with the mounting surface is wider than the opposite end that faces the inner surface of the skin of said aircraft wing to provide a larger more stable platform for the attachment of a component or bracket thereto, without any excessive increase in weight.

In one embodiment, the depth of the recess in the collar is greater than the height of the bolt retaining member such that the collar, and a component or bracket received on the upper mounting face, is clamped against an inner surface of the aircraft skin by the component or bracket retaining member.

In another embodiment, the depth of the recess in the collar is less than the height of the bolt retaining member such that the collar, and a component or bracket received on the upper mounting face, is clamped against the bolt retaining member by the component or bracket retaining member.

In another embodiment, the depth of the recess in the collar is equal to the height of the bolt retaining member such that the collar, and a component or bracket received on the upper mounting face, is clamped against an inner surface of the aircraft skin and against the bolt retaining member by the component or bracket retaining member. This arrangement has the advantage of spreading the load between the bolt retaining member and the skin.

The collar may include a flange that protrudes radially from the open end of the recess, said flange having an outer surface that faces the inner surface of the skin.

According to another embodiment, the fastener assembly of the invention preferably includes a bracket to mount a component, said bracket defining a recess configured to surround said bolt retaining member and form an enclosed space around the bolt retaining member received on the shaft of the bolt.

In one embodiment, the depth of the recess is greater than the height of the bolt retaining member such that the bracket is clamped against an inner surface of the skin by the bracket retaining member.

In an alternative embodiment, the depth of the recess is less than the height of the bolt retaining member so that the bracket is clamped against the bolt retaining member.

In another alternative embodiment, the depth of the recess is equal to the height of the bolt retaining member so that the bracket is clamped against an inner surface of the aircraft skin and against the bolt retaining member by the bracket retaining member.

Preferably, the bracket has a hole therein, the shaft of the bolt retaining member being a clearance fit through said hole.

In any embodiment of the invention, the bracket or component retaining member is a nut.

According to the invention, there is also provided an aircraft wing having an outer skin, the shaft of a bolt of the fastener assembly according to the invention extending through a hole in the skin, a bolt retaining member being threadingly received on the shaft to retain the bolt in position in said hole and, a bracket or component retaining member being threadingly received on a portion of the shaft protruding from the bolt retaining member and retaining a bracket or component therebetween.

In some embodiments, the bolt is a clearance fit in the hole in the skin but in other embodiments in may be an interference fit.

According to another aspect of the invention, there is provided a method of containing plasma generated by out-gassing due to electromagnetic energy tracking along a clearance gap present between a fastener and a skin of an aircraft wing through which the fastener extends and to which a component or bracket is attached to mount said component or bracket to the inner surface of said skin, wherein the fastener assembly comprises a bolt having a shaft and a bolt retaining member that threadingly cooperates with the shaft to retain the bolt in a position in which it extends through a hole in the skin, and a component or bracket retaining member that also threadingly cooperates with a portion of the shaft protruding through said bolt retaining member to attach a component or bracket to said inner surface, wherein the method comprises the step of locating a collar over the bolt retaining member received on the shaft to form an enclosed space around the bolt retaining member to contain any plasma that may be generated and isolate it from any fuel stored in the skin of said aircraft wing, the collar having an aperture therein for the shaft to extend therethrough and an upper mounting face to mount a component or bracket against the collar with the component or bracket retaining member threadingly received on a portion of the shaft protruding through the collar and the component or bracket.

BRIEF DESCRIPTION OF THE DRAWINGS

FIG. 1 does not form part of the invention, but is included for the purposes of background information only;

With reference to FIG. 1, there is shown a side elevation of two fastener assemblies 1 fixed to the inner surface 2b of the skin 2 of an aircraft wing and with a mounting bracket 3 attached thereto.

Figure 1:
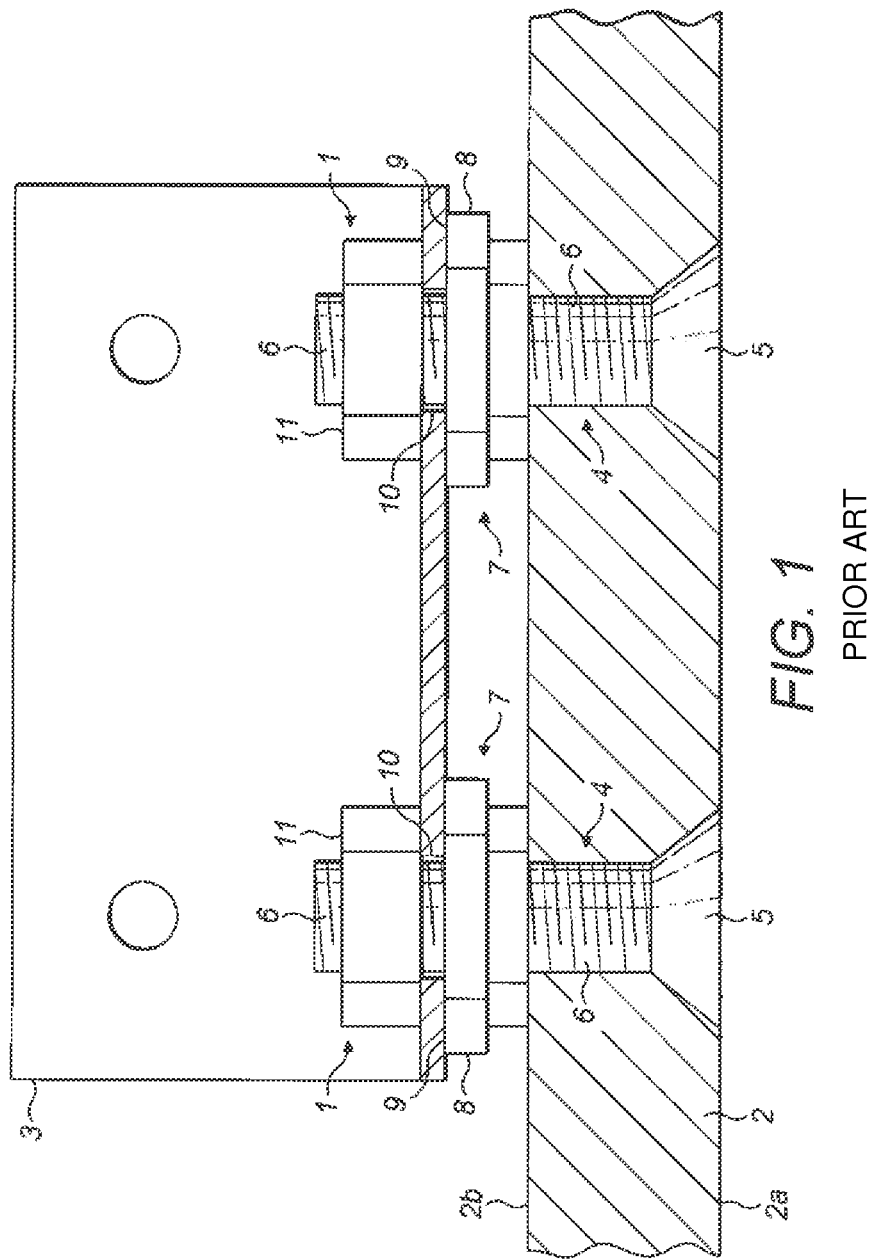
FIG. 1 is a side, part cross-sectional elevation of two fastener assemblies fixed within the skin of an aircraft wing and with a mounting bracket attached thereto.

Each fastener assembly 1 comprises a bolt 4 having a head portion 5 which is countersunk into the outer surface 2a of the skin 2 and a threaded shaft 6 that extends through the skin 2 and protrudes beyond the inner surface 2b. The bolt 4 is an interference fit within a sleeved hole formed in the skin 2 so that the out-gassing phenomenon, which only occurs due to the presence of a gap when a clearance fit fastener is used, is avoided.

A bolt retaining member 7 is threadingly received on the shaft 6 and is tightened against the inner surface 2b of the skin. Although the bolt retaining member 7 may be an ordinary nut with a hex shaped outer wall for engagement with a standard spanner or wrench for tightening, it is preferably provided with an enlarged portion 8 at one end remote from the surface 2a. The enlarged portion 8 provides the bolt retaining member 7 with a large upper surface area 9 that forms a stable clamping surface to receive and mount an L or T-shaped bracket or component 3 thereagainst. The enlarged portion 8, the remaining portion or both portions of the bolt retaining member 7 may have a facetted or hex-shaped outer wall for engagement with a standard tool for tightening.

The bolt 4 and the bolt retaining member 7 together form a part of the fastening assembly which is permanently retained in place and need never be removed from the skin.

The bracket 3 has a hole 10 so that the bracket 3 may pass over the shaft 4 and seat against the surface 9. The shaft 4 may be a clearance fit within the hole 10 to enable easy removal of the bracket as necessary.

The bracket 3 is retained in place against the surface 9 by a bracket or component retaining nut 11 which threadingly engages with the shaft 6 and tightens against the bracket 3 so as to clamp the bracket 3 between the bolt retaining member 7 and the bracket retaining nut 11. The bracket retaining nut 11 may be an ordinary hex-shaped nut that can be tightened using a standard spanner or wrench.

It will be appreciated that in order to release the bracket 3, it is only necessary to undo the bracket retaining nut 11 and the bolt 4 and bolt retaining member can remain in place.

DESCRIPTION OF THE PREFERRED EMBODIMENTS

Figure 2:
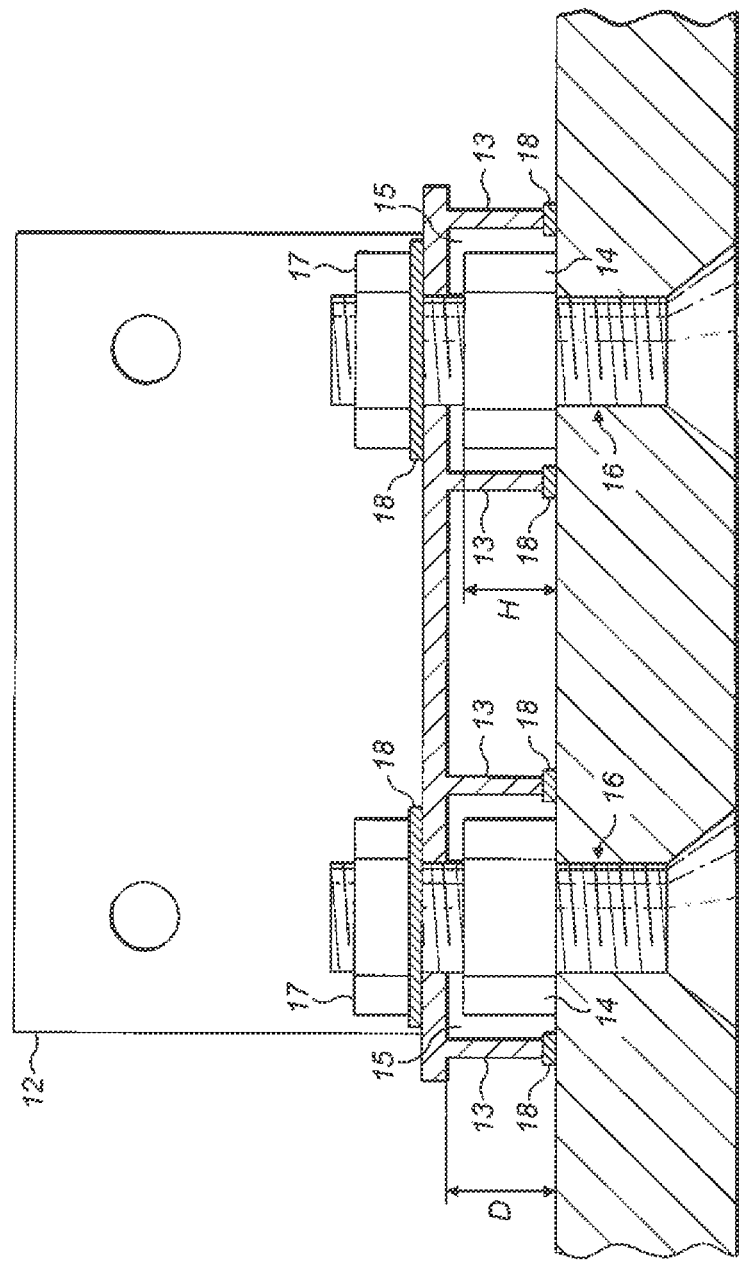
FIG. 2 is a side, part cross-sectional elevation of two fastener assemblies according to a first embodiment of the present invention fixed within the skin of an aircraft wing and with a mounting bracket attached thereto.

Referring now to FIG. 2, it can be seen that the fastener assembly according to a first embodiment has a modified bracket 12 having a wall 13 that surrounds the bolt retaining member 14 to form an enclosed space 15. As the bolt 16 in this embodiment is of the clearance fit type, the enclosed space 15 contains any plasma as a result of out-gassing due to lightening tracking down the clearance gap between the bolt 16 and the aircraft skin 2, where it quickly cools and dissipates its energy.

As with the configuration shown in FIG. 1, a bracket retaining nut 17 clamps the bracket 12 in place. As can be seen in FIG. 2, the depth 'D' of the recess is greater than the height 'H' of the bolt retaining member and so the bracket retaining nut 17 clamps the bracket 12 to the inner surface 2b of the skin 2 via the wall 13, without loading the bolt retaining member 14.

A layer of sealant 18 may be applied to the end face of the walls 13 of the recess and to the region beneath the bracket retaining nut 17 so as to seal the space 15 and more effectively contain any out-gassing therein.

Figure 3:
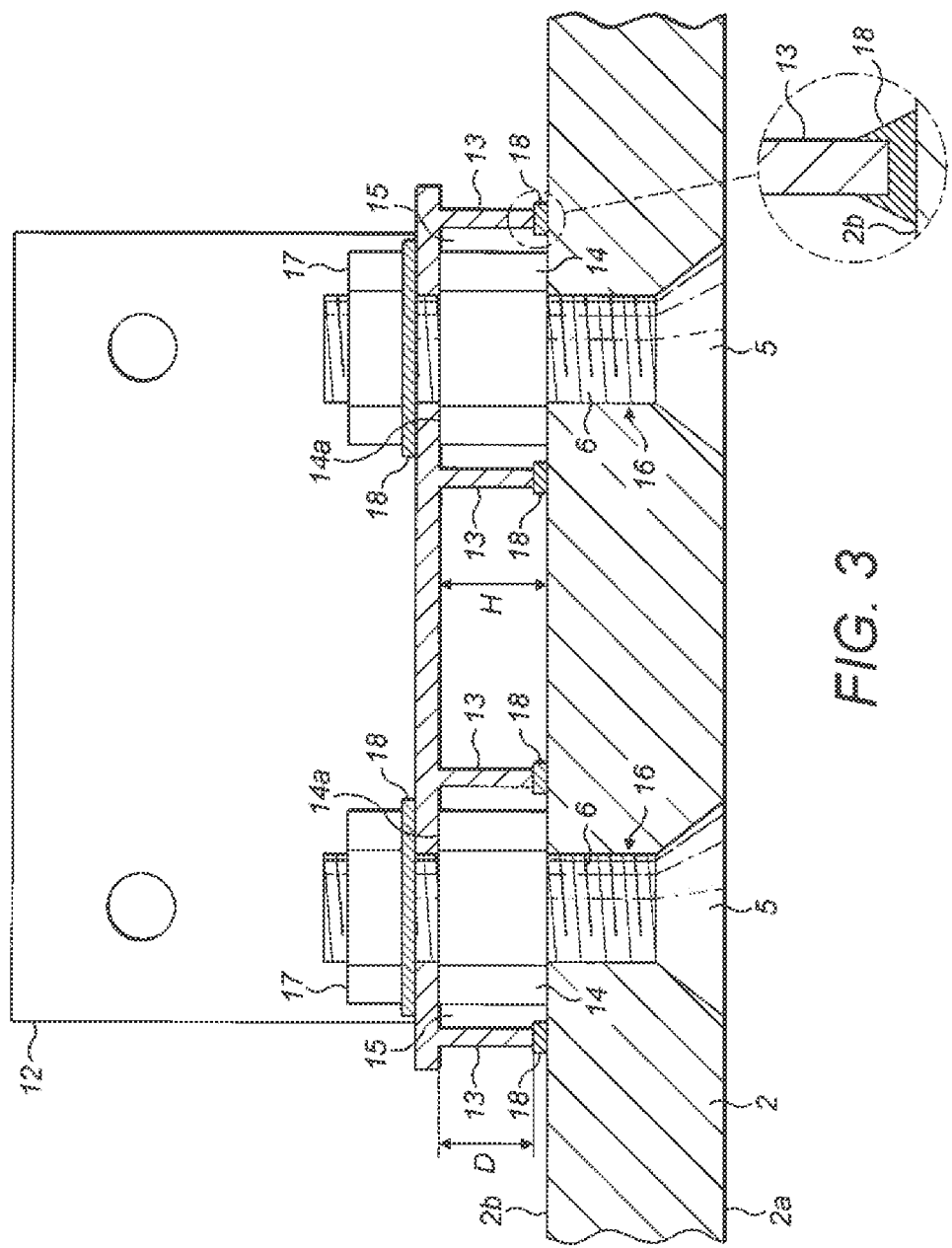
FIG. 3 is a side, part cross-sectional elevation of two fastener assemblies according to a second embodiment of the present invention fixed within the skin of an aircraft wing and with a mounting bracket attached thereto.

The second embodiment, shown in FIG. 3, is similar to the embodiment of FIG. 2, except that the depth 'D' of the recess is less than the height 'h' of the bolt retaining member 14 so that the bracket 12 clamps to the upper surface 14a of the bolt retaining member 14. The clearance gap formed between the end face of the walls 13 of the recess can be filled with sealant 18 to retain any out-gassing therein.

Figure 4:
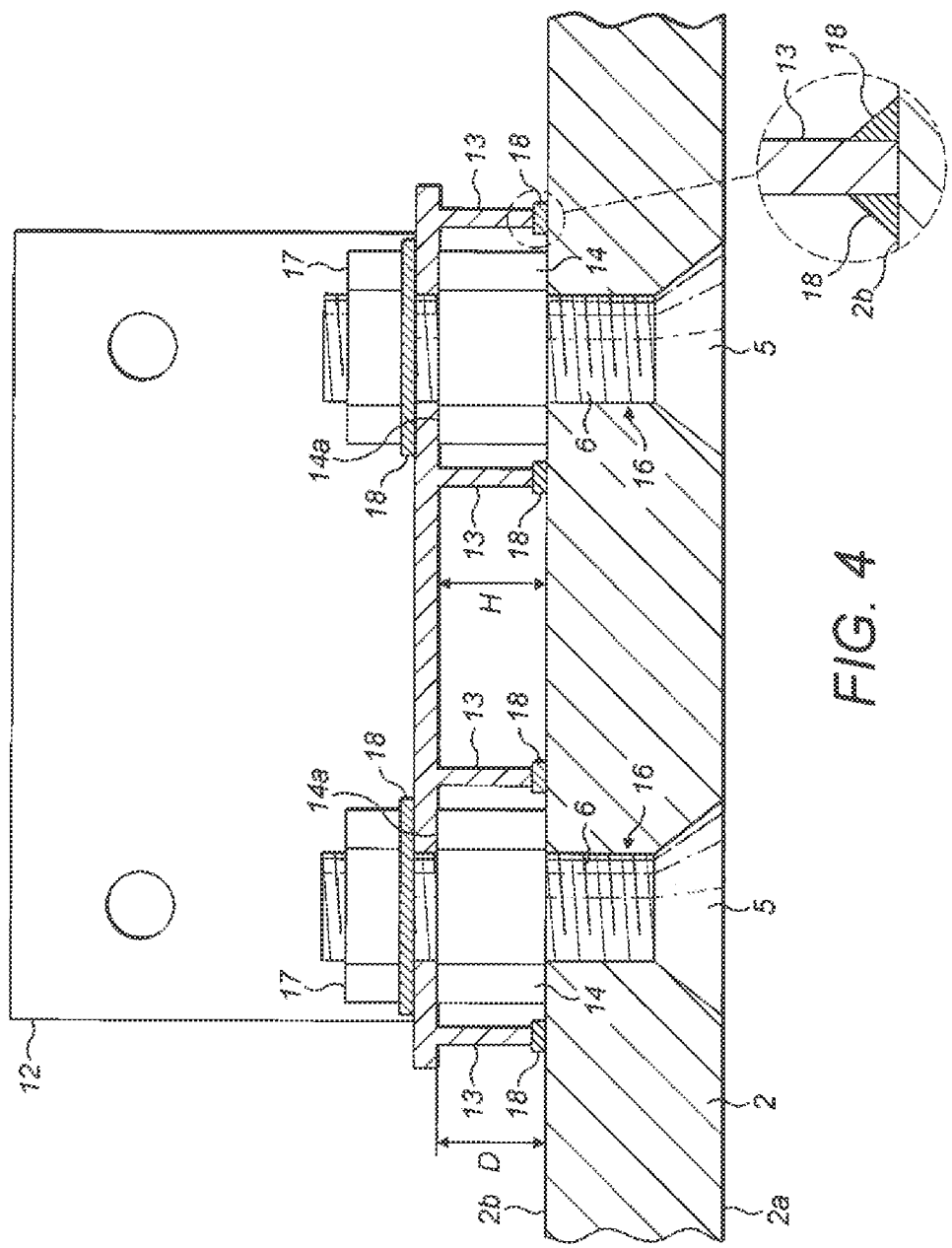
FIG. 4 is a side, part cross-sectional elevation of two fastener assemblies according to a third embodiment of the present invention fixed within the skin of an aircraft wing and with a mounting bracket attached thereto.

The third embodiment, shown in FIG. 4, is similar to the embodiment of FIGS. 2 and 3, except that in this embodiment, the depth 'D' of the recess is equal to the height 'h' of the bolt retaining member 14 so that the bracket 12 clamps to both the upper surface 14a of the bolt retaining member 14 and also to the inner surface 2b of the skin. This embodiment has the advantage that the load from the bracket 12 is spread between the bolt retaining member 14 and the upper surface 2b of the skin 2, thereby reducing the risk of fatigue and increasing load carrying capacity.

As with the previous embodiments, sealant 18 may be applied between the end of the wall 13 and the surface 2b of the skin and also between the bracket retaining member 17 and the surface of the bracket 12.

Figure 5:
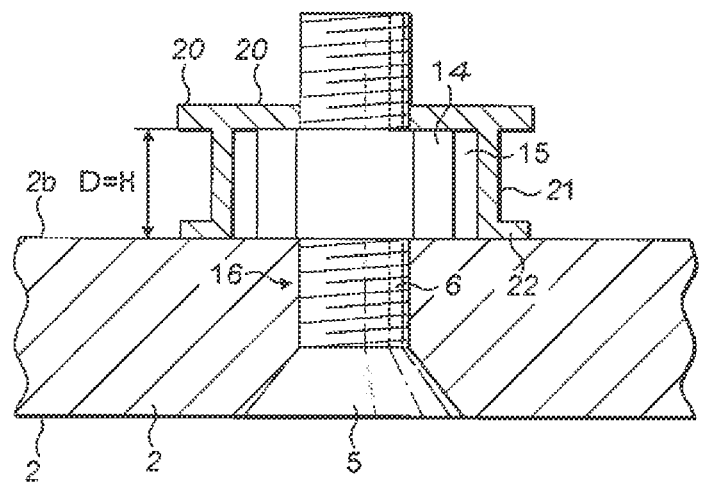
FIG. 5 is a side, part cross-sectional elevation of a single fastener assembly according to a fourth embodiment of the present invention fixed within the skin of an aircraft wing and including a collar attached thereto.

The fourth embodiment, shown in FIG. 5, is similar to the first to third embodiments, except that the bracket 12 is replaced with a collar 20. The collar 20 has an upper surface 20a to which a bracket or component may be mounted and retained in place by the bracket retaining member 17 (not shown in FIG. 5). The collar 20 has a wall 21 to define a recess that surrounds the bolt retaining member 14 to form a space 15 to contain any out-gassing therein.

As shown in FIG. 5, a flange 22 may be formed at the lower end of the wall 21 to provide a greater area of contact between the collar 20 and the inner surface 2b of the skin 2. A similar flange (not shown) may also be formed at the end of the wall 13 described with reference to any of the previous embodiments 2 to 4. It will be appreciated that the depth 'D' of the recess in the collar 20 is equal to the height 'h' of the bolt retaining member 14 so that the bracket contacts the upper surface 14a of the bolt retaining member 14 and the inner surface 2b of the skin to spread the load and allow a greater clamping force to be used. However, it will also be appreciated that the depth 'D' of the recess may also be less than the height 'h' of the bolt retaining member 14.

Figure 6:
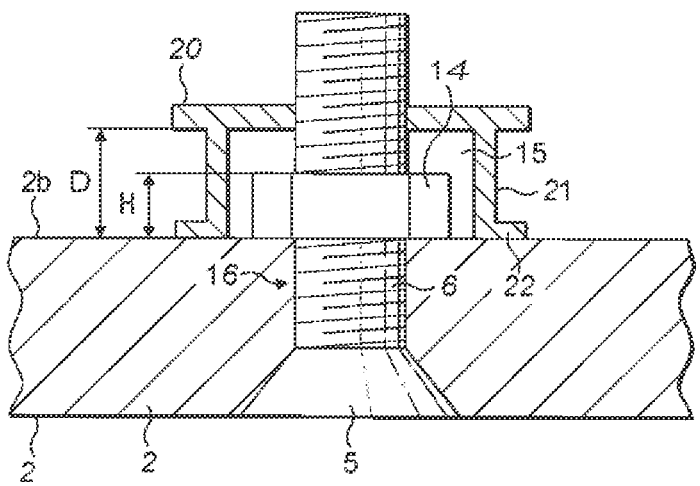
FIG. 6 is a side, part cross-sectional elevation of a single fastener assembly according to a fifth embodiment of the present invention fixed within the skin of an aircraft wing and including a collar attached thereto.

The embodiment shown in FIG. 6 is similar to the embodiment of FIG. 5, except that the depth 'D' of the recess in the collar 20 is greater than the height 'h' of the bolt retaining member 14 so that the bolt retaining member 14 is not loaded by the bracket 12 or bracket retaining member 17 and all the load is carried by the skin 2. It will be appreciated that the space 15 is also larger in this embodiment and so has more capacity to contain any out-gassing.

As with the previous embodiments, sealant may be applied between the flange 22 and the inner surface of the skin and also between the bracket retaining member and the upper surface of the component or bracket clamped to the upper surface of the collar 20, to contain any out-gassing within the space 15.

Although many of the preferred embodiments show two fastener assemblies being used to hold a single bracket in place, it will be appreciated that any number of assemblies may be used for this purpose. Ideally, at least two are used in order to provide a redundant back-up in the event of failure of one fastener assembly.

The foregoing description is given by way of example only and modifications may be made to the fastener assembly of the present invention without departing from the scope of the appended claims. For example, although reference is made to an L or T-shaped bracket, it will be appreciated that the bracket can take many different shapes or forms and can be made from a metallic or non-metallic material. A component may also be mounted directly to the fastener assembly in place of a bracket or the bracket may be integrally formed with a component.

The invention claimed is:

1. A fastener assembly for attaching a bracket to an inner surface of a skin of an aircraft wing, comprising a bolt having a shaft and a bolt retaining member threadingly cooperating with the shaft to retain the bolt in a position in which it extends through a hole in the skin of the aircraft wing, a collar freely locates over the bolt retaining member received on the shaft to form an enclosed space around the bolt retaining member, the collar having a recess to contain plasma generated by out-gassing due to electromagnetic energy tracking along a clearance gap present between the bolt and the skin of the aircraft wing through which the bolt extends, wherein the collar has an aperture therein for the shaft to extend freely therethrough and an upper mounting face to receive the bracket, and a collar and bracket retaining member threadingly cooperating with a portion of the shaft protruding through the collar to attach the bracket and the collar to said inner surface of the skin of the aircraft wing.

2. The fastener assembly according to claim 1, wherein the depth of the recess in the collar is greater than the height of the bolt retaining member such that the collar is clamped against an inner surface of the aircraft skin by the collar and bracket retaining member.

3. The fastener assembly according to claim 1, wherein the depth of the recess in the collar is less than the height of the bolt retaining member such that the collar is clamped against the bolt retaining member by the collar and bracket retaining member.

4. The fastener assembly according to claim 1, wherein the depth of the recess in the collar is equal to the height of the bolt retaining member such that the collar is clamped against an inner surface of the aircraft skin and against the bolt retaining member by the collar and bracket retaining member.

5. The fastener assembly according to claim 1, wherein the depth of the recess is greater than the height of the bolt retaining member such that the bracket is clamped against an inner surface of the aircraft skin by the collar and bracket reinnertaining member.

6. The fastener assembly according to claim 1, wherein the depth of the recess is less than the height of the bolt retaining member so that the bracket is clamped against the bolt retaining member by the collar and bracket retaining member.

7. The fastener assembly according to claim 1, wherein the depth of the recess is equal to the height of the bolt retaining member so that the bracket is clamped against an inner surface of the aircraft skin and against the bolt retaining member by the collar and bracket retaining member.

8. A fastener assembly for attaching a bracket to an inner surface of a skin of an aircraft wing, comprising a bolt having a shaft and a bolt retaining member threadingly cooperating with the shaft to retain the bolt in a position in which it extends through a hole in the skin of the aircraft wing, a collar freely locates over the bolt retaining member received on the shaft to form an enclosed space around the bolt retaining member, the collar having a recess to contain plasma generated by out-gassing due to electromagnetic energy tracking along a clearance gap present between the bolt and the skin of the aircraft wing through which the bolt extends, wherein the collar has an aperture therein for the shaft to extend freely therethrough and an upper mounting face to receive the bracket, and a collar and bracket retaining member threadingly cooperating with a portion of the shaft protruding through the collar to attach the bracket and the collar to said inner surface of the skin of the aircraft wing, wherein the collar includes a flange that protrudes radially from the open end of the recess, said flange having an outer surface that faces the inner surface of the skin of an aircraft wing.

9. A method of containing plasma generated by out-gassing due to electromagnetic energy tracking along a clearance gap present between a fastener assembly and a skin of an aircraft wing through which the fastener assembly extends and attaches a bracket to an inner surface of the skin of the aircraft wing, wherein the fastener assembly comprises a bolt having a shaft and a bolt retaining member threadingly cooperating with the shaft to retain the bolt in a position in which it extends through a hole in the skin of the aircraft wing, and a collar and bracket retaining member threadingly cooperating with a portion of the shaft to attach a collar and the bracket to said inner surface of the skin of the aircraft wing, wherein the method comprises the step of freely locating the collar over the bolt retaining member received on the shaft to form an enclosed space around the bolt retaining member to contain any plasma that generated and isolate the plasma from any fuel stored in the skin of the aircraft wing, the collar having an aperture therein for the shaft to extend freely therethrough and an upper mounting face to mount the bracket against the collar with the collar and bracket retaining member threadingly received on a portion of the shaft protruding through the collar and the bracket.

10. A fastener assembly and a bracket, the fastener assembly being configured to attach the bracket to an inner surface of a skin of an aircraft wing, the fastener assembly comprising a bolt having a shaft and a bolt retaining member threadingly cooperating with the shaft to retain the bolt in a position in which it extends through a hole in the skin of the aircraft wing, wherein the bracket freely locates over the bolt retaining member and comprises a collar having a recess that forms an enclosed space around the bolt retaining member to contain plasma generated by out-gassing due to electromagnetic energy tracking along a clearance gap present between the bolt and the skin of the aircraft wing through which the bolt extends, the bracket having an aperture therein for the shaft to freely extend therethrough and the fastener assembly further comprising a bracket retaining member threadingly cooperating with a portion of the shaft protruding through the bracket to attach the bracket to the inner surface of the aircraft wing.

* * * * *